(12) United States Patent
Evans et al.

(10) Patent No.: US 11,478,679 B2
(45) Date of Patent: Oct. 25, 2022

(54) SYSTEMS AND METHODS FOR PROVIDING COMPUTER DISPLAYS IN AQUATIC ENVIRONMENTS

(71) Applicant: Real Big Waves LLC, San Antonio, TX (US)

(72) Inventors: George Reid Evans, San Antonio, TX (US); Victor Miller, Sonoma, CA (US)

(73) Assignee: Real Big Waves LLC, San Antonio, TX (US)

( * ) Notice: Subject to any disclaimer, the term of this patent is extended or adjusted under 35 U.S.C. 154(b) by 0 days.

(21) Appl. No.: 17/235,660

(22) Filed: Apr. 20, 2021

(65) Prior Publication Data

US 2021/0327316 A1 Oct. 21, 2021

Related U.S. Application Data

(60) Provisional application No. 63/012,871, filed on Apr. 20, 2020.

(51) Int. Cl.
 *A63B 24/00* (2006.01)
 *G06F 3/01* (2006.01)
 (Continued)

(52) U.S. Cl.
 CPC ...... *A63B 24/0006* (2013.01); *A63B 24/0075* (2013.01); *A63B 24/0087* (2013.01);
 (Continued)

(58) Field of Classification Search
 None
 See application file for complete search history.

(56) References Cited

U.S. PATENT DOCUMENTS

| | | | | |
|---|---|---|---|---|
| 4,290,084 A | * | 9/1981 | Minshull | G06T 5/30 358/448 |
| 4,879,849 A | * | 11/1989 | Hollingsworth, III | A63J 25/00 472/60 |

(Continued)

OTHER PUBLICATIONS

International Search Report issued for International PCT Application No. PCT/US21/28218, dated Aug. 6, 2021, 13 pages.
(Continued)

*Primary Examiner* — Jason A Pringle-Parker
(74) *Attorney, Agent, or Firm* — Sprinkle IP Law Group

(57) ABSTRACT

Systems and methods for providing a distortion-free pool-surface display beneath a swimmer. In one embodiment, projectors are positioned below a water level at opposite walls of a pool, and are configured to project images to a display surface at the bottom of the pool beneath a swimmer. A camera is used to view images projected by the projectors and to provide corresponding image data to an image correction platform on a graphics processing unit (GPU). The image correction platform identifies distortions in the images, generates image corrections that counter the identified distortions, and applies the corrections to subsequently projected images. The image correction platform also generates image adjustment that cause overlapping portions of the projected images to match seamlessly. The projected images may provide immersive experiences, coaching/training interfaces or other interactive displays.

14 Claims, 5 Drawing Sheets

(51) Int. Cl.
| | |
|---|---|
| *G06T 7/70* | (2017.01) |
| *G02B 23/22* | (2006.01) |
| *G09G 3/00* | (2006.01) |
| *H04N 9/31* | (2006.01) |
| *G06V 40/20* | (2022.01) |
| *G06V 40/10* | (2022.01) |
| *G03B 21/606* | (2014.01) |

(52) U.S. Cl.
CPC ............ *G02B 23/22* (2013.01); *G06F 3/017* (2013.01); *G06T 7/70* (2017.01); *G06V 40/107* (2022.01); *G06V 40/23* (2022.01); *G06V 40/28* (2022.01); *G09G 3/001* (2013.01); *H04N 9/3179* (2013.01); *A63B 2024/0009* (2013.01); *A63B 2024/0012* (2013.01); *A63B 2024/0081* (2013.01); *A63B 2024/0096* (2013.01); *G03B 21/606* (2013.01); *G06T 2207/30196* (2013.01); *G06T 2207/30221* (2013.01); *G09G 2354/00* (2013.01)

(56) References Cited

U.S. PATENT DOCUMENTS

| | | | |
|---|---|---|---|
| 9,620,080 B2 | 4/2017 | Reddy et al. | |
| 11,072,443 B1* | 7/2021 | Bollfrass | B64G 7/00 |
| 2005/0200840 A1* | 9/2005 | Terui | G01S 7/4813 |
| | | | 356/237.2 |
| 2011/0089297 A1* | 4/2011 | Bishop | F16M 11/24 |
| | | | 248/224.8 |
| 2012/0019784 A1* | 1/2012 | Fuller | G03B 21/10 |
| | | | 353/121 |
| 2013/0181901 A1* | 7/2013 | West | G06T 1/60 |
| | | | 345/1.3 |
| 2013/0278501 A1* | 10/2013 | Bulzacki | G06K 9/627 |
| | | | 345/157 |
| 2014/0085613 A1* | 3/2014 | Doyle | G03B 21/608 |
| | | | 353/121 |
| 2015/0153634 A1* | 6/2015 | Reddy | H04N 9/3182 |
| | | | 348/81 |
| 2016/0063748 A1* | 3/2016 | Kim | H04M 1/72427 |
| | | | 715/778 |
| 2016/0071486 A1* | 3/2016 | Byers | H04N 9/3194 |
| | | | 345/690 |
| 2016/0080710 A1* | 3/2016 | Hattingh | G06T 3/005 |
| | | | 348/745 |
| 2016/0148432 A1* | 5/2016 | Hattingh | G06T 19/00 |
| | | | 345/426 |
| 2016/0151695 A1 | 6/2016 | Pacheco Moreira Amorim | |
| 2017/0100656 A1 | 4/2017 | Laflamme et al. | |
| 2017/0178524 A1* | 6/2017 | Firmin | G09B 5/02 |
| 2018/0100320 A1* | 4/2018 | Suri | E04H 4/12 |
| 2019/0106896 A1 | 4/2019 | Kwiatkowski | |
| 2019/0206048 A1* | 7/2019 | Crabtree | G06T 7/0006 |

OTHER PUBLICATIONS

Yadav, "What's the Difference Between Standard, Short Throw and Ultra Short Throw Projects?" Dec. 14, 2017, [Retrieved from <<https://www.ooberpad/.com/blogs/audio-video-tips/whats-the-difference-between-standard-short-throw-ultra-and-ultra-short-throw-projectors>>], Dec. 14, 2017.

PointCloud Media LLC | Raylight4D Pool Projection, PointCloud Media LLC, retrieved from http://pointcloudmedia.com/raylight4d-pool-projection/, on Apr. 1, 2022, 2 pgs.

Lightform, Inc. homepage, Design Tools for Projection Mapping, Lightform, Inc., San Francisco, CA, retrieved from https://lightform.com, on Apr. 1, 2022, 4 pgs.

* cited by examiner

SYSTEMS AND METHODS FOR PROVIDING COMPUTER DISPLAYS IN AQUATIC ENVIRONMENTS

RELATED APPLICATIONS

This application claims priority under 35 U.S.C. § 119(e) to U.S. Provisional Application No. 63/012,871, entitled "Immersive and Interactive Flume Swimming Pool/Spa and Training Software and Facility", filed Apr. 20, 2020, which is fully incorporated herein by reference for all purposes.

TECHNICAL FIELD

This invention relates generally to the field of computer displays and more particularly to systems and methods for providing displays using mapped projections within an aquatic environment.

BACKGROUND

Swimming is one of the most popular, healthy and entertaining activities for youths in the United States, but this participation drops significantly for adults. For many, this is because swimming is boring, isolating, and inaccessible. Participation in swimming related activities would likely increase substantially if it were possible to provide better access to pools, an enhanced sense of enjoyment of swimming and a sense of belonging to group or swimming community.

Flume swimming pools/spas are small pools or spas which have pump systems that recirculate water through the pool/spa from one end to the other in order to create a water current through the pool/spa. A swimmer using one of these pools/spas can therefore swim in the current while remaining substantially stationary within the pool/spa. This allows the swimmer to swim for what is the equivalent of tens or hundreds of meters without leaving the confines of the pool/spa which is only several meters long.

While flume swimming pools/spas may increase the accessibility of swimming ad provide increased opportunities for exercise, the fact that the swimming experience occurs within the confines of a relatively small, unchanging space may cause the swimmer to find the experience boring or isolating. It would therefore be desirable to provide improvements to flume swimming pools/spas which make them more enjoyable, entertaining and/or useful.

SUMMARY

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

The systems and methods disclosed herein are used to provide a unique immersive, multi-sensorial experience that can increase people's enjoyment of swimming and recapture the sense of joy they had while swimming as children. Disclosed embodiments incorporate elements that project images from multiple projectors onto the interior surfaces of a pool and use camera feedback to enable the projected images to be warped and blended together to form a combined display that is positioned under and around a swimmer within the pool. This enables users/swimmers to have an immersive experience, as well as participating, both remotely and on site, in activities ranging from competition to training to physical rehabilitation under the guidance of coaches, physicians and other professionals. These systems and methods can therefore connect like-minded and similarly situated users to create a larger sense of community.

In one embodiment, a system comprises a flume pool having an enclosure with a floor and first and second side walls, wherein the enclosure is adapted to contain water therein. The system includes first and second projectors, where the first projector is positioned at the first wall and adapted to project a first image through the water from the first wall to a display surface on the floor of the enclosure. Similarly, the second projector is positioned at the second wall and adapted to project a second image through the water from the second wall to a display surface on the floor of the enclosure. In some embodiments, at least a portion of the first image projected on the display surface on the floor of the enclosure overlaps with a corresponding portion of the second image which is also projected on the display surface on the floor of the enclosure. The system may also include a camera which is configured to capture overhead images corresponding to the first and second images projected on the display surface on the floor of the enclosure, where the first and second images comprise calibration images. The camera may be an overhead camera positioned above a level of the water in the pool enclosure and configured to capture the overhead images at least partially through an air-water interface. A GPU may be provided, where the GPU is configured to receive the overhead images, and generate image corrections based on the overhead images which cause the portion of the first image which overlaps with the corresponding portion of the second image to seamlessly match. The GPU may also be configured to generate one or more image corrections based on the overhead images where the image corrections counter corresponding distortions in the first and second images.

In some embodiments, the first and second projectors are ultra short throw digital laser projectors. Each of the first and second projectors may be positioned behind windows that are installed in the side walls of the pool enclosure so that the projectors project their respective images through the respective windows. The windows may be installed below the water level in the pool enclosure so that the first and second images are projected through corresponding air-window and window-water interfaces. The windows may be formed using an acrylic or other suitable transparent material.

Each projector may be adapted to project its corresponding images onto a portion of the display surface which is opposite the wall from which the image is projected. The display surface may be treated to provide a smooth surface onto which the display images can be projected. In one embodiment, the display surface comprises a layer of vinyl which is applied to the floor of the pool enclosure, but alternative embodiments may use fiberglass, smoothed and painted concrete, a powder coated steel plate, etc. The display surface may include a forward surface which is contiguous with the floor of the enclosure and is inclined with respect to the floor of the enclosure to face the swimmer. Portions of the first and second images may be projected onto the inclined forward surface.

The system may include a game engine which is configured to generate the first and second images. The game engine may be responsive to user input from a swimmer in the enclosure. The game engine may be configured to generate images in synchronization with corresponding control signals that control a flow of the water through the enclosure. The game engine may further be configured to generate coaching/training displays by overlaying coaching/training indicators on a real time image of the swimmer, where the coaching/training indicators are indicative of the swimmer's body position with respect to a desired body position.

Numerous alternative embodiments may be possible.

The embodiments disclosed herein provide a number of advantages over existing systems and methods. For instance, the system allows a display to be provided beneath a swimmer in a pool without having to install a conventional monitor (e.g. a flat panel display) at the bottom of the pool in a waterproof enclosure or beneath a transparent window. The system also enables the use of projection displays to achieve a pool-bottom display while avoiding the distortions that are caused by disturbances at the water's surface in the pool. A swimmer can therefore easily swim above the projection display without causing distortions in the displayed images.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
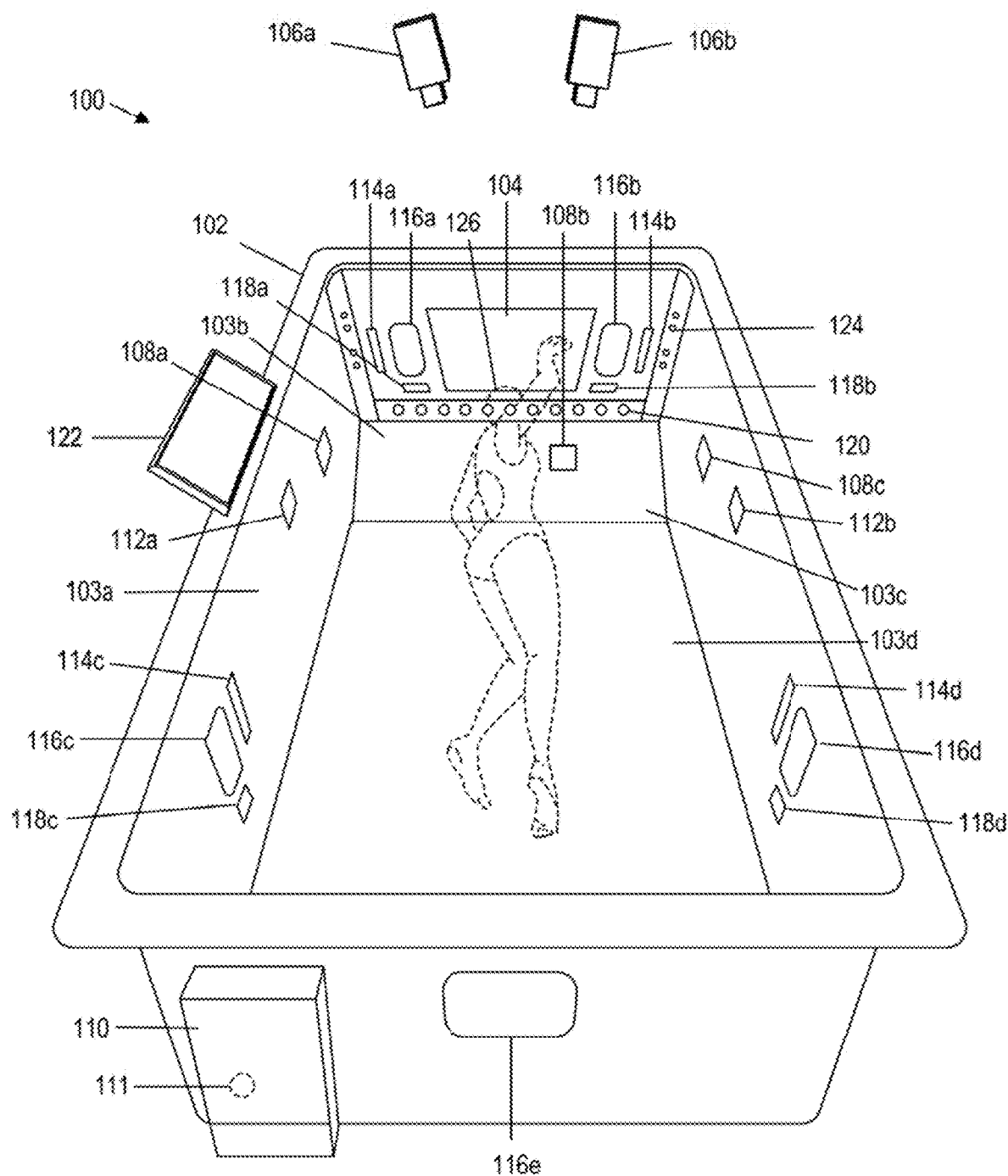
FIG. 1 is a diagram illustrating an exemplary flume pool/spa system in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present invention include systems and methods for providing an immersive user experience in an aquatic environment through the use of projected displays. Aquatic environments, particularly pools, aren't conducive to projecting images onto their interior surfaces for a number of reasons. For example, projecting images through water causes refraction and distortion of the images so that it is difficult to produce clear images on the pool surfaces. Furthermore, in order to enable the projection of images below a swimmer, it is necessary to position the projectors near the bottom of the pool, essentially underwater. Attempting to project images through the surface of the water onto the pool bottom is not viable, particularly in light of disturbance which are created on the water's surface by the swimmer, wind, or other causes.

While there are a number of projection mapping software companies that combine an array of projectors and seamlessly mesh the projections against various surfaces, none offer a solution to effectively project underneath the water's surface to create a seamless, and disturbance free projected image on the floor of a pool below a swimmer. Further, no currently available projection mapping software offers a solution for dealing with refraction caused by projecting an image through a subsurface window and the water in a pool.

In some embodiments of the present invention, a display is provided by projecting images onto one or more interior surfaces of a flume pool/spa enclosure using ultra short throw projectors. Ultra short throw projectors use special wide angle lenses and mirrors to "throw" the image onto the screen from a very short distance. Ultra short throw projectors generally have a throw ratio (the ratio of the distance from the lens to the screen to the screen width) of less than 0.4. Most regular throw projectors need to be around an inch away from the projection surface for every inch of screen size. Ultra short throw projectors also virtually eliminate shadows and eye glare.

The systems and methods disclosed herein are used to provide a unique immersive, multi-sensorial experience that can increase people's enjoyment of swimming and recapture the sense of joy they had while swimming as children. Disclosed embodiments incorporate elements that project images from multiple projectors onto the interior surfaces of a pool and use camera feedback to enable the projected images to be warped and blended together to form a combined display that is positioned under and around a swimmer within the pool. This enables users/swimmers to have an immersive experience, as well as participating, both remotely and on site, in activities ranging from competition to training to physical rehabilitation under the guidance of coaches, physicians and other professionals. These systems and methods can therefore connect like-minded and similarly situated users to create a larger sense of community.

One embodiment of the present invention is a flume swimming pool/spa system. For purposes of brevity, this may be referred to simply as a pool. It should be noted that this system is provided as an example, and alternative embodiments may be implemented in other types of aquatic environments as well, such as larger pools or bodies of water which may or may not have flume functions. The exemplary pool incorporates a set of cameras that capture image data of a swimmer in the pool, a set of computer processors that receive image data from the cameras, interpret the image data to identify gestural movements of the swimmer, and generate outputs that are provided to a set of projectors that project corresponding images (static or video) onto one or more interior surfaces of the pool.

The set of cameras may include, for example, overhead cameras which are positioned above the swimmer and the surface of the water in the pool, as well as subsurface cameras which are positioned below the surface of the water. The overhead cameras may capture images of the swimmer's entire body, while the subsurface cameras may capture close-up images of the swimmer's head/face, arms and/or hands so that more detail is available for identification of head and hand gestures. At least one camera is configured to view the images which are projected onto the interior surface(s) of the pool. Information from this camera is used to identify and correct for the distortion of display images resulting from their projection through the corresponding windows and the water in the pool onto the pool surfaces. The information from the camera is also used to ensure that the images are properly meshed together where they overlap on the pool surfaces.

The computer processors may include, for example, a set of processors that may be configured to handle specific functions of the system. In one embodiment, the system includes a graphics processing unit (GPU), a central processing unit (CPU) and a game engine. In this embodiment, the CPU handles the movement of data between the other components of the system (e.g., from the cameras to the GPU, from the GPU to the game engine, etc.) The GPU is a specialized processor that is configured to receive raw image data from the cameras and to process this data. The GPU executes a computer vision platform which generates body position data from received images, as well as an image correction ("warp and mesh") platform which identifies the distortions of the images projected for the pool-surface display, implements corrections for the distortions, and enables the blending of the projected images.

Data generated by the GPU is provided to the game engine, which may interpret received data (e.g., identifying gestures or activity represented in the images) and generate images (e.g., representative of a user interface or user experience) to be projected onto the pool surface as a display. The game engine may also generate outputs which control the operation of the pool.

The swimming pool/spa system can enhance the swimming experience by displaying to the user/swimmer (e.g., via ultra short throw digital laser projectors) real or fictional worlds which evolve and are altered, both visually and tactically, based on user input. For example, an application may control the flow of water through the pool enclosure to allow the user to swim, while at the same time presenting video of a swimming experience (e.g., swimming in an open-water environment, or in a coral reef world) in synchronization with the water flow to simulate the real-life experience. This is enabled in part by the pool-surface display which includes an arrangement of cameras, projectors and windows made of acrylic or other transparent materials installed on the outside/bottom of the typically above-ground pool, as well as a warp and mesh projection application executing on the GPU. Embodiments could also be implemented in non-above-ground pools, but the projectors would likely need to be encased within a watertight container or enclosure.

In a calibration mode, calibration images are projected by the display projectors onto the pool surface. An overhead camera captures images of the display area and provides this data to the image correction platform executing on the GPU, which then maps the images on the display surfaces in the pool. The image correction platform determines images corrections (e.g., image warping) based on the captured data and stores this information for use in processing images that are to be projected for the pool surface display. The image correction platform also determines and stores any adjustments to the images which are necessary to cause the projected images to seamlessly blend together where they overlap in the pool surface display area. The calibration process only needs to be performed once, although if the projectors are moved or otherwise lose calibration, the process may be repeated.

The image correction platform also manages corrections for refraction resulting from projection of the images through the windows and water. The system thereby enables projection of display images on an underwater surface underneath a swimmer, where the display is unaffected by water surface distortions, warpage, etc. A swimmer can therefore swim above the projected pool-bottom display, watch the display and enjoy an immersive visual experience as naturally as a person might watch a television.

Embodiments disclosed herein can also provide features such as user detection, personal identification of users, gesture detection, monitoring and responding to users, providing exercise modules, interconnecting pools, enabling custom experience designs, collecting data, identifying system status, and detecting emergencies. These features are described in more detail below.

User and Gesture Detection. Embodiments disclosed herein can detect if a user is in the pool, where the user is in the pool and what the activity or movement is occurring, such the speed and location of the user, duration of particular activities, nature and duration of specific physical activities and gestures. This is made possible by using a combination of a camera array around and within the pool. All of the camera's feeds are delivered to two different artificial intelligence software platforms for real-time analysis. One is a complete computer vision platform that detects and recognizes a human's movement. It then layers and skeletally maps that movement, helping the system understand where an individual's limbs and body is. Basic gestural movements detected by the computer vision platform are interpreted as inputs (e.g. such as "select this button," stand-up to stop the pool flow, etc.) The image/video feeds from the cameras are also provided to software which interprets that data and makes sense of it for deeper physiological analysis. For example, this software may determine the number of strokes performed by the swimmer and its stroke force velocity.

Monitor and Respond. The present embodiments may monitor, record and respond to a user, including recognition of the user, recognizing physical movements, analyzing speed, angle and velocity of the user, monitoring and recognizing various input requests (i.e. interactions) provided by the user, and monitoring and recognizing emergency situations. This is enabled by taking the footage of the live feeds of the camera array system and analyzing it in real time with the computer vision platform, which provides the system with the capability to analyze the swimmer as well as utilize the swimmer as a game controller. For the game controller aspect, the swimmer will have been trained on gestures that the computer recognizes as inputs, which the computer can then use as decisions to adjust aspects of the overall system (e.g. speed of water flow, what to display through the projectors, making a selection within a graphical user interface, etc.)

Exercise Modules. Dynamic training modules can be used in the disclosed embodiments to automatically change the speed of the water current while the user is swimming in order to adjust to the desire speed of the user. The disclosed embodiments feature pre-programmed workouts for beginner, intermediate and advanced levels using exercise modules ranging from high-impact training conditions to slow cool-down speeds. The pre-programmed workouts contain software that alerts and controls the speed of the motor. If there is no preprogrammed speed for a workout routine, the computer uses the camera array and the computer vision platform to detect swimmers movement and speed, which then reports back to the computer to determine the appropriate speed for the motor to deliver flow. The computer will then make automatic adjustments to the motor's VFD to allocate the proper speed of the water flow.

Connected Pools. The system digitally connects to the cloud, enabling users to interact with other users and facilitators, which is helpful in enabling and facilitating various competitive, coaching and rehabilitative scenarios.

Custom Experience Designs. Users or game developers can design custom worlds and respective physical activities within the pool system.

Data Collection. Some embodiments collect, store and analyze data for each user, tracking fitness progress with metrics like distance, calories, time, etc. The user can choose to access and activate their data in order to generate more personalized and predictive environments, responses/feedback and ability to share data with other users. The data can also be utilized by therapists, physicians and coaches in assessing the user's progress and adjusting routines or techniques based on this digital feedback. The computer software can recommend workouts or training regimens for the swimmer based on an analysis of their previous workout history, stroke analysis (accomplished via computer vision), and goals. The software then pairs them with the most relevant workouts or training regimes.

System Status. Some embodiments communicate and detail their history, repairs, problems, updates, etc. to people researching, diagnosing, repairing or buying or selling the system.

Emergency Detection. Some embodiments detect stress and emergency related events and alert appropriate persons, including 911, and initiate immediate safety protocols (e.g. rapid auto-draining of a pool).

Referring to FIG. 1, an exemplary flume pool/spa system in accordance with some embodiments is shown. In this embodiment, the pool system 100 is integrated into a pool enclosure 102 which is partially filled with water, forming an aquatic environment. Pool enclosure 102 has a water propulsion or recirculation system that circulates water through the enclosure, creating a water current within the enclosure that allows a user/swimmer to swim in the pool while remaining substantially stationary. The water recirculation system includes a pumping system (not explicitly depicted in the figure) which draws water from enclosure 102 through an outlet (not shown in the figure) at a rearward end of the enclosure and returns the water to the enclosure through an inlet 104 at the forward end of the enclosure. The specific details of the basic recirculation functions of the water recirculation system are not described in detail here, since they are not important the invention.

Pool system 100 includes a series of cameras that are used to capture images of the swimmer within the aquatic environment of the pool. In this embodiment, the series of cameras includes two overhead cameras 106a and 106b. These cameras are positioned to capture images of the swimmer from above the surface of the water. In some embodiments, one or more of the overhead cameras has a field-of-view which is sufficiently wide to capture images of the swimmer's entire body. The images from the overhead cameras therefore allow subsequent processing to determine the position of the swimmer's entire body (including head, arms, hands, legs, feet) for purposes of analysis.

In some embodiments, one of these overhead cameras is also used to capture images that are projected onto the interior surfaces (e.g., the bottom) of the pool when the swimmer is not in the pool. This information is provided to the image correction ("warp and mesh") platform on the GPU to enable calibration/correction of the image projections. In alternative embodiments, a separate overhead camera which is dedicated to calibration/correction functions may be provided. In still other embodiments, the calibration/correction may be performed using an in-pool (subsurface) camera.

It should be noted that, when a common reference number is used with an alphabetic character to indicate components of the system (e.g., overhead cameras 106a and 106b), the common reference number may be used herein without the alphabetic character to collectively indicate the set of components that use the common reference number, or to indicate any one of the components using the common reference number (e.g., "overhead cameras 106" refers to both camera 106a and camera 106b, and "overhead camera 106" refers to either of camera 106a and camera 106).

The series of cameras incorporated into system 100 also includes one or more subsurface cameras 108a-108c. As depicted in FIG. 1, this embodiment actually has windows in the walls and floor of enclosure 102 through which subsurface cameras view the swimmer. The cameras themselves are positioned behind these windows (e.g., at the exterior of enclosure 102). It should be understood that that other embodiments may alternatively use other configurations for the subsurface cameras, such as using cameras that can themselves be positioned within the water inside the enclosure. Subsurface cameras 108 may be used to obtain a different view of the swimmer, obtain images with greater detail, or obtain images that are not distorted by the air-water interface Each of overhead cameras 106 and subsurface cameras 108 is connected to a computer system 110. Raw image data is conveyed by each of the cameras for processing by the computer system, which may contain one or more processors that are configured to process and interpret the data. Computer system 110 may, for example, include a GPU that is specifically configured to process the calibration images from the overhead cameras to identify and correct distortions in the images projected onto the interior pool surfaces. Additionally, the GPU may be configured to examine the images of the swimmer to identify the position of the swimmer's body (e.g., skeletal joints, arms, hands, fingers, etc.) within the images. A computer vision application is executed by the GPU to perform this function.

Body position information which is generated by the GPU is output to a game engine in the computer system which is configured to determine whether the swimmer's body position and/or changes in the body position from image to image over time represents a gesture or action by the swimmer. The game engine may be programmed to take preprogrammed actions in response to the identification of corresponding gestures or body positions that are identified in the received position information. For instance, if the swimmer stops swimming and stands up in the pool enclosure, the game engine may generate a control output which stops the recirculation of water through the pool enclosure, and may further pause an application (e.g., for playback of video) which is currently in use by the swimmer.

Computer system 110 is connected to the projector display system that is integrated into the pool enclosure. These projectors receive display images generated by the game engine for display to the swimmer. In one embodiment, a pair of projectors 112a, 112b are positioned on each side of the pool enclosure. These projectors are ultra short throw projectors that are configured to project images on the interior surfaces 103 of pool enclosure 102 (e.g., floor and front and side walls). As with the cameras, the figure depicts windows in the enclosure, and the projectors are positioned behind the windows so that their respective images are projected through the windows and onto the enclosure surfaces. Other embodiments may use alternative display configurations. In addition to the displays projected into the inners surfaces of pool enclosure 102, a touchscreen monitor 122 or other type of conventional display can be provided at the upper part of the enclosure wall to enable the swimmer to have direct manual interaction with the pool system.

In some embodiments, computer system includes components which are configured to enable interconnection of pool system 100 to other devices external to the system (e.g., via wireless network 111). For example, computer system 110 may be configured to enable communication between this system and similar pool systems 110 to enable "competitions" or other interactions between swimmers in the different systems. Any other type of external device may also be enabled to communicate with pool system 100 via this network connection. The system may include various different types of technologies to enable this communication between devices, including ethernet, Wi-Fi, Bluetooth, or any other suitable technology.

Pool system 100 may include various sensors 114 which are connected to computer system 110, and which provide data which is input to the computer system to facilitate, enable or augment the interpretation or analysis of image data received from cameras 106 and 108. For instance, sensors 114 may include depth sensors, radar sensors, acoustic sensors, or the like which assist in determining the position of the swimmer's body within enclosure 102. Sensors 114 may also provide data related to the condition or operation of the pool system itself, such as temperature sensors, water level sensors, waterflow sensors, etc.

In this embodiment, pool system 100 includes a set of speakers 116 which are installed in enclosure 102 to provide audio within the aquatic environment of the system. The speakers may provide audio that accompanies a video playback, sounds associated with an application executing on computer system 110, audio signals generated as a component of a user interface, or any other sounds that might be provided to the user. The speakers may be used with bone conduction headphones 126 that are worn by the user. Pool system 100 further includes a set of lights 118 which are installed in enclosure 102. These lights may be, for example, LEDs that are provided to illuminate the interior of enclosure 102, provide visual effects associated with applications executing on computer 110, provide visual feedback as part of a user interface, etc. Pool system 110 also includes a set of bubble ports 120 which are positioned at the forward and of enclosure 102. These ports may be used to generate bubbles that provide sensory effects to the swimmer as part of an application for an immersive experience. Still further, pool system 110 includes a set of water jets 124 which can inject hot or cold water into enclosure 102 to provide sensory effects which further enhance the immersive experience that is presented to the swimmer. Some of these features of the pool are described in more detail below.

Large video displays. Embodiments of the present invention have projected screens that cover many surfaces in order to create a seamless environmental sensation. This transforms the space to feel like a boundless world. The images projected on the screen (e.g., the interior surfaces of the pool enclosure) are programmed to move at the same speed as the water flow of the pool, and in the direction of the user moves, so that the user feels as if they are in that environment. This is accomplished by pairing the power of the flow motor's variable flow drive and matching it with the flow rate of the projected environment. In some cases, the speed flow of the video may need to actually flow faster or slower than the actual water flow in order to augment a sense of realism or prevent nausea. The experience does not feel like one is watching a movie or recorded footage, but instead feels like one is in the environment and moving seamlessly through it, just as one would if they were actually, physically in that environment.

Bubble ports. During certain experiences in some embodiments, bubbles are released into the pool to enhance the sensation of a projected visual environment (e.g. an underwater explosion), or be used to indicate important events (e.g. yardage markers) in a swimming event. These bubbles are also be used to provide feedback the user can feel, similar to that of a vibration setting on a mobile phone.

Water jets. During certain moments in embodiments of the present invention, water jets create targeted pressure streams to enhance the sensation of a projected visual environment (e.g. a whale shark "brushing" past the user). These jets are also used to provide feedback the user can feel, similar to that of a vibration setting on a mobile phone.

Speakers. In some embodiments, sounds are introduced into the pool to complement the visualized environment and deliver numerous types of sounds and music. In these embodiments, speakers can deliver sound to develop ambient noise, signal an alert, emphasize a planned moment, etc., which last many seconds or minutes, depending on what is best needed to compliment the technology experience. In some embodiments of the present invention, speakers also allow therapists, coaches, physicians, and other users to communicate with the user in real time.

Bone Conduction Headphones. Bone conduction headphones may deliver audio to help the user discern between music, sounds and spoken words. In some embodiments, bone conduction headphones work in tandem with the other speakers to enhance the overall effect of any sounds. In some embodiments, they also provide direct communication to a user from a coach, physical therapist, competitor, or otherwise.

LED lights. LED lights can contribute to a number of features. For instance, through colors, the system's LEDs signal that a pool is available, occupied or needs service, that the user requires assistance or help, or that the user has achieved a goal/status. In another example, the LEDs enhance the displayed environment. For example, if a digital "shark attack" is about to occur, the LEDs can illuminate the entire pool with a blinking red aura. In another example, LEDs provide recognition of interaction/feedback with the pool. For example, in some embodiments, if a user selected a specific workout, the lights quickly flash green. The system's lighting also serves/provides a diverse variety of functions such as signaling excessive effort, improper technique, completion of a particular regimen, pool status, and many different entertainment functions.

Hot/Cool Streams. Embodiments of the present invention may eject brief streams of fluid that are either hot or cold in order to provide the user a secondary sensation to compliment the visual environment. For example, the user might swim over an ocean trench, and the present embodiments may introduce a cool stream that surrounds a user's body. The hot/cool jets can also be used to super cool or heat the user to improve their endurance or ability to swim harder, longer.

Wave-Maker. Embodiments of the present invention may produce waves for a number of reasons, such as to mimic the ocean or create a sense of open water swimming, provide disruptive interference, signal events or timeframes or to deliver a sensation that compliments the environment.

Flume Current. The flume-style current in the present embodiments is generated at the front of the pool, allowing a user to swim in place in the center of the pool due to the fact their stroke rate and speed is counterbalanced by the speed of the flume. The flume speed self-adjusts based on the environment program, as well as reacts to the user's speed when necessary (e.g. speed up if the user increases speed).

Computers. Embodiments disclosed herein use a computer(s) (and their software and algorithms) to control the pool and its features so that the user experiences a seamless, personalized and dynamic experience. The system's computer is responsible for numerous tasks, such as, pre-loading a program chosen by the user, adjusting the pool's environment based on the activity, recognizing the user in the pool (including analyzing their movements), managing data connections between pools, processing any artificial intelligence data and learnings, updating its software and firmware, incorporating new technological additions (physical and digital), and more.

Wifi. Embodiments of the present invention can connect to the internet so pools can receive and deliver data to and from the cloud constantly on a real time basis. Through WiFi, these embodiments connect to other machines, creating a mesh network where information can be shared. Networked pools offer users the ability to play games and competitions between each other, deliver data on-demand or on a schedule and receive instant updates simultaneously, providing a unified pool experience. Networking further allows off-site management of users located in many different venues by a central figure such as a therapist or coach who remotely oversees a group on a real time basis.

Bluetooth. Embodiments disclosed herein may use wearable devices to enhance the ability to interact, react and learn from the user. For example, the user might wear a series of sensors on their arms and legs that provide a clearer picture of the user's movement and efficiency through the water. The wearable devices transfer data to the pool to improve the experience to better reflect the user's movement and capability.

Cameras. Embodiments of the present invention use a series of cameras mounted in, around and/or above the pool to provide computer vision, help the computer identify the user, know who the user is (i.e. their name, swimming background, workout history, etc.) and their movements, and then automatically adjust the pool's functions. The computer vision is used in understanding the user's interactions (i.e. directives to the computer), as well as states of health. For example, the computer vision detects if a user has chosen to move to the left in an environment, or requested the flume to increase its flow speed or accept a request to compete in a shared real-time workout from another connected pool. Additionally, the computer vision detects if a user is in distress, automatically sending an alert for help and beginning a quick rapid response draining of the pool. Information acquired by the pool's cameras is shared with complimentary technologies of the system to maximize monitoring accuracy and user safety. The computer vision also allows remote monitoring and assessment of each user without the necessity of physical, on site presence.

Depth sensors. A user's position in the pool can be determined by a depth sensor. This data point helps adjust the flow of the flume speed, as well as the displayed environment around the user. Depth sensors also detect directions provided to the pool from the user. Information from the depth sensor is shared with the lasers and cameras for improved monitoring accuracy.

Lasers. The lasers detect a user is in the pool, and importantly monitor their heart rate. This feature enables the pool to understand if a person is in distress, or conversely, if they are not meeting a desired cardiovascular goal. This data adjusts according to the biometrics of the user. Information acquired by the lasers is shared with complimentary technologies of the system to maximize monitoring accuracy and user safety.

LED Touchscreen. Some embodiments of the present invention use a screen placed on the side of the pool to give the user the ability to provide physical, manual input to the pool system, effectively enabling the pool to be controlled without the need to analyze a user's gestures. The pool screen also displays certain information pertinent to the user in the pool, to maintenance personnel or to emergency responders.

Figure 2:
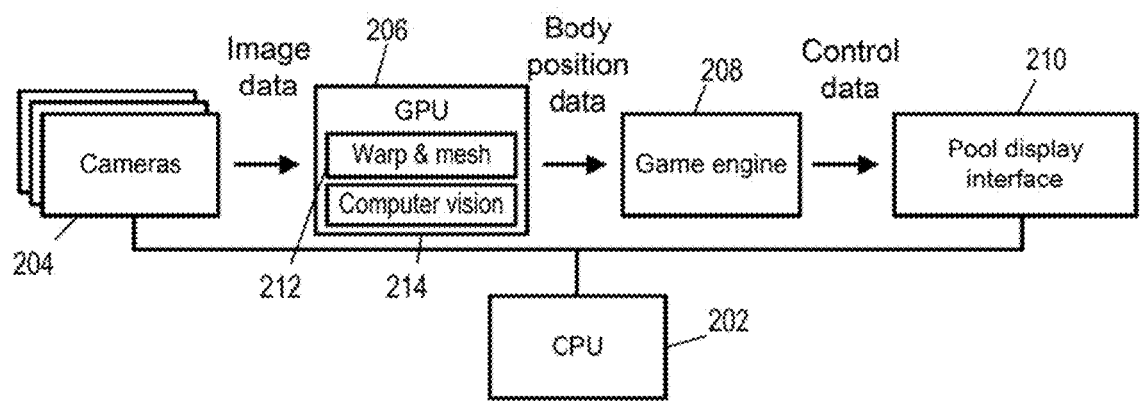
FIG. 2 is a block diagram illustrating the flow of information between components of the exemplary pool system in accordance with some embodiments.

Referring to FIG. 2, a block diagram illustrating the flow of information between components of the exemplary pool system is shown. As depicted in this figure, CPU 202 is coupled to cameras 204, GPU 206, game engine 208 and pool display interface 210. CPU 202 is configured to manage the transfer of information between these other components of the system. For example, CPU 202 may be responsible for tasks such as pre-loading a program chosen by the user, adjusting the pool's environment based on the activity, recognizing a specific user in the pool (including analyzing their movements), managing data connections between pools, processing any artificial intelligence data and learnings, updating its software and firmware, incorporating new technological additions (physical and digital), and the like.

As noted above, cameras 204 (which include the overhead and subsurface cameras) capture images of the display on the interior surfaces of the pool (in the calibration mode) and images of the swimmer within the pool enclosure (when the pool is in use). The image data generated by the cameras is provided to GPU 206, which processes the calibration image data with the image correction ("warp and mesh") platform 212 to identify distortions in the images projected by the display system and generate corrections to account for these distortions, and processes the images of the swimmer when the pool is in use to identify the swimmer's body position. The warp and mesh image correction information generated by the image correction platform may be stored in the GPU so that the GPU can thereafter apply the image correction information to images that will be provided to the in-pool projection display system. Alternatively, this information can be provided to the display system, which may incorporate a separate dedicated GPU that applies corresponding image corrections to images that are received by the display system for projection onto the pool surfaces. As another alternative, the image correction information may be provided to game engine 208, which may apply the corrections in the generation of images to be output to display interface 210.

When the pool is in use, the images of the swimmer which are captured by cameras 204 are processed to identify key points of the body using a skeletal mapping function of computer vision platform 214. This information is conveyed by CPU 202 to game engine 210, which may be implemented using an application such as Unity. Game engine 210 receives the key points of the swimmer's body position from the CPU and executes logic to detect and identify gestures and other movements represented by the body position (e.g., the user/swimmer standing up, or making a head or hand gesture). The game engine then drives an interface update (e.g., an image for a game screen or graphical feedback for a coaching/training interface) which is provided to the display interface for projection by the in-pool display. The game engine may also generate signals that are provided to a pool control system (e.g., to change the water flow through the pool).

Figure 3:
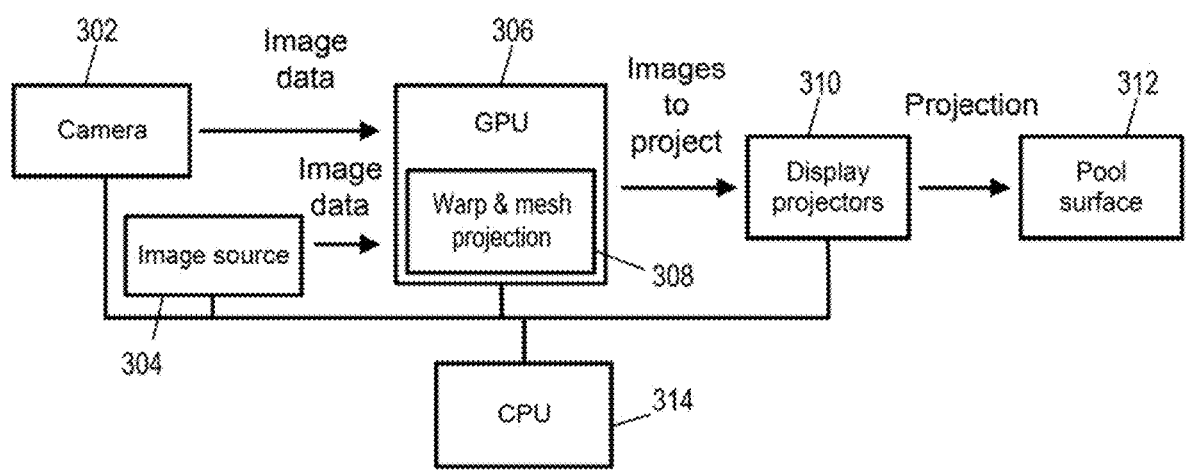
FIG. 3 is a diagram illustrating an alternative configuration of the pool system in accordance with some embodiments.

Referring to FIG. 3, a diagram illustrating an alternative configuration of the pool system in accordance with some embodiments is shown. In this embodiment, the system does not explicitly include a game engine. The system includes a calibration camera 302 and an image source 304 which provide image data to GPU 306. GPU 306 executes an image correction platform ("warp and mesh projection") 308 which identifies and corrects distortions in the projected images of the display. GPU 306 implements corrections to image data that is received from camera 302 and image source 304. The corrected image data is provided to display projectors 310 which project the corrected images onto pool surface 312. CPU 314 is connected to camera 302, image source 304, GPU 306 and display projectors 310, and is configured to manage the transfer of data between these components.

Figure 4:
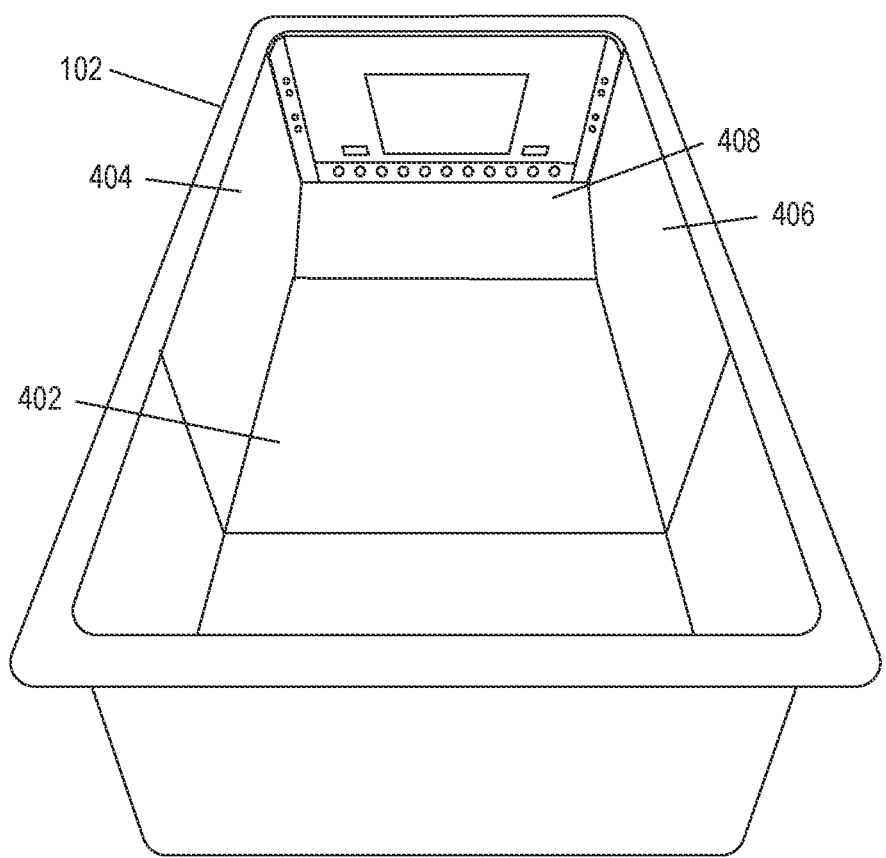
FIG. 4 is a diagram illustrating the position/layout of the projected in-pool display in accordance with some embodiments.

Referring to FIG. 4, a diagram illustrating the position/layout of the projected in-pool display is shown. As noted above, the display is projected onto the interior surfaces of pool enclosure 102. In this embodiment, the display includes a center portion 402 that extends across the floor of the pool enclosure beneath the swimmer. The display is continued on a left side portion 404 and a right side portion 406 that extend up the left and right walls of the enclosure. Additionally, a forward portion 408 of the display is positioned at the forward end of the enclosure. The forward portion 408 of the display is projected onto an inclined surface (i.e., a surface that is not coplanar with the floor of the enclosure, but is instead angled with respect to the floor). Because the surface onto which forward display portion 408 is projected is inclined, the images projected onto this surface face more directly toward the swimmer. This makes it easier for the swimmer to view the images, and also reduces distortion/warpage in the images since the surface more directly faces the projectors of the display system.

Figure 5:
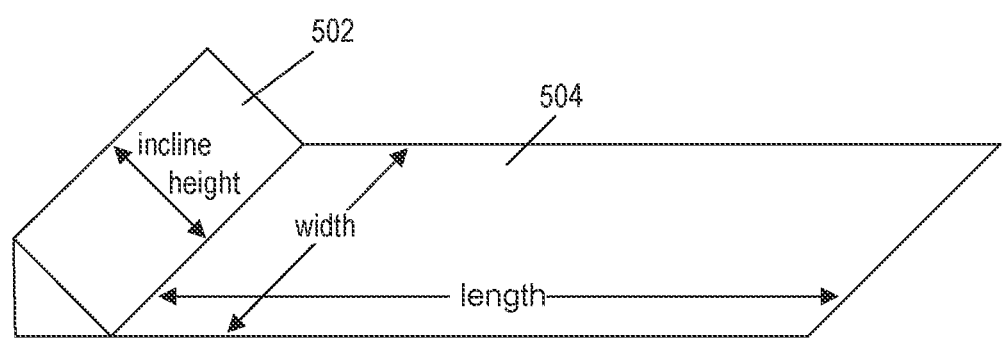
FIG. 5 is a diagram illustrating a display surface at the bottom of a pool enclosure in accordance with some embodiments.

Referring to FIG. 5, a diagram illustrating a display surface at the bottom of a pool enclosure in accordance with some embodiments is shown. As depicted in this figure, an angled structure is provided at the forward end of the floor of the pool enclosure so that an inclined surface 502 is formed. Inclined surface 502 is contiguous with the bottom of the enclosure and is not coplanar with the bottom of the enclosure, but is instead angled with respect to the bottom. In one embodiment, this display surface structure has a width of approximately 10 feet, and a length of approximately 13 feet from the top of inclined panel 502 to the opposite end of horizontal portion 504. Inclined portion 502 has an incline height (from its top edge to its bottom edge) of approximately 10 feet. Inclined surface 502 and horizontal surface 504 may be covered with a layer of white vinyl material in order to provide a smooth surface onto which the display images can be projected. For instance, a 60 mill sheet of white vinyl material may be used. As noted above, other materials (e.g., fiberglass, smoothed and painted concrete, powder coated metal plate, etc.)

Figure 6:
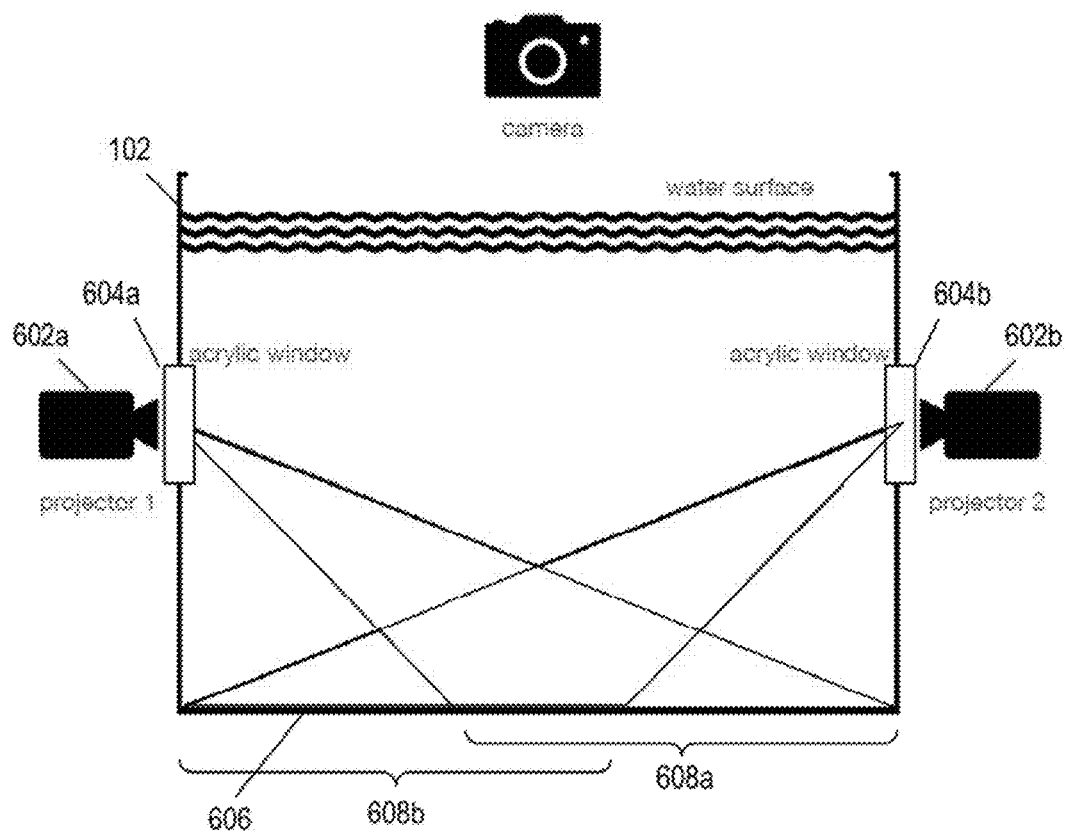
FIG. 6 is a diagram illustrating the projection of images onto a display surface at the floor of a pool enclosure in accordance with some embodiments.

Referring to FIG. 6, a diagram illustrating the projection of images onto a display surface at the floor of a pool enclosure in accordance with some embodiments is shown. As depicted in this figure, two projectors 602 are positioned behind opposing walls of the pool enclosure. Each projector 602 is positioned at the exterior of the pool enclosure behind a corresponding acrylic window 604. In one embodiment, the acrylic is approximately 1.5 inches thick. Each projector in this embodiment is an ultra short throw digital laser projector which is configured to project a corresponding image onto a horizontal display surface 606 at the bottom of the pool enclosure. In this embodiment, the image projected by one of the projectors is projected onto a portion of display surface 606 on the opposite side of the enclosure. For example, projectors 602a, which is on the left side of the pool enclosure, projects an image onto a portion 608a of the display surface which is on the right side of the pool enclosure. Similarly, projector 602b, which is on the right side of the pool enclosure, projects its image onto a portion 608b of display surface 606, where the portion 608b, is on the left side of the pool enclosure.

The projection of the images onto the opposite sides of display area 606 results in several advantages, such as increasing the effective distance between the projector and the display surface, which mitigates the ultra short throw requirement. Additionally, reducing the angle at which the image is projected downward from horizontal reduces the angle of incidence of the rays of the projected image at the acrylic window and reduces the distortion and other issues caused by refraction at the interfaces with the window. Still further, the downward projection angles of the projectors mitigates any occlusion or interference of the projected images by a swimmer, as the swimmer's hands pass through a "valley" created by the projections.

In one embodiment, pool enclosure 102 is approximately 10 feet wide and 4 feet deep. Projectors 602 are positioned approximately 3 feet above the display surface 606 at the bottom of the pool enclosure. Because projectors 602 are in very close proximity to the display surface 606 onto which they must project their respective images, it is preferred that they are ultra short throw projectors. In other words, the projectors are capable of projecting a very large image (e.g., approximately 6-7 feet wide across the center of the image)

at a very short distance (e.g., approximately 6-7 feet from the projector at the center of the image).

It can be seen in FIG. 6 that the images projected onto display portions 608a and 608b overlap. Since the images overlap at the center of display area 606, it is necessary to ensure that the images match (i.e., the overlapping portions of the images must be the same, so that there appears to be only a single image at this point. This is insured by projecting a calibration image (or images) from each of the projectors and capturing the projected image from each projector using overhead camera 612. In one embodiment, overhead camera 612 is positioned approximately 6-7 feet above the surface of the water in the pool enclosure. Overhead camera 612 should not be positioned near the flowhead wall (the water recirculation outlet) at the forward end of the pool enclosure in order to avoid disturbances caused by water flow at the flowhead wall. In one embodiment, camera 612 is positioned approximately 5-6 feet from the flowhead wall.

The image data captured by camera 612 is provided to the image correction platform, which determines from this data whether the two calibration images are properly meshed (i.e., appear to be only a single image where they overlap). This is the mesh function of the "warp and mesh" correction. If the two calibration images are not the same where they overlap, the image correction platform generates a correction or adjustment for one or both of the images to account for any mismatch. Alternatively, or in combination with the automated calibration/alignment of the image correction platform, the positions of the projectors can be manually adjusted to more closely align the calibration images. After the image correction has been determined, it may be applied to the calibration images (or to the projectors) before they are again projected onto the display surface 606. If the overlapping portions of the projected images match, no further adjustment is necessary. If the projected images still do not quite match, another adjustment may be generated and applied. This process may be repeated until the overlapping portions of the two calibration images match.

Figure 7:
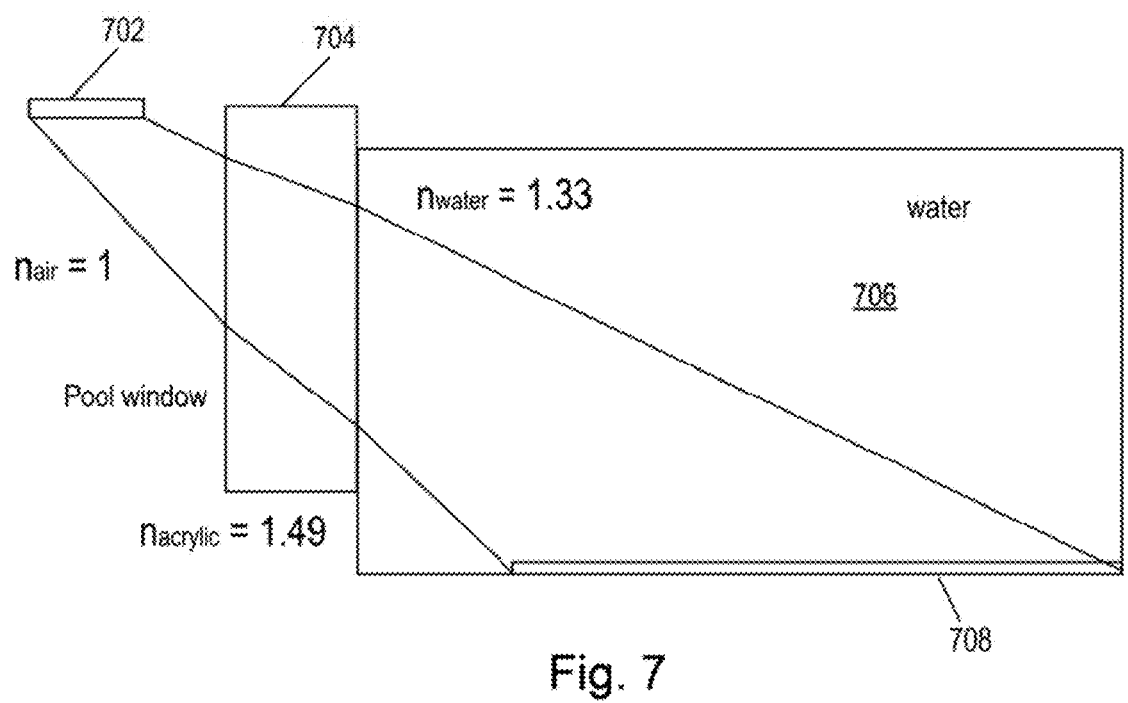
FIG. 7 is a diagram illustrating the refraction of light through the acrylic window and the water in the pool in accordance with some embodiments.
Figure 8:
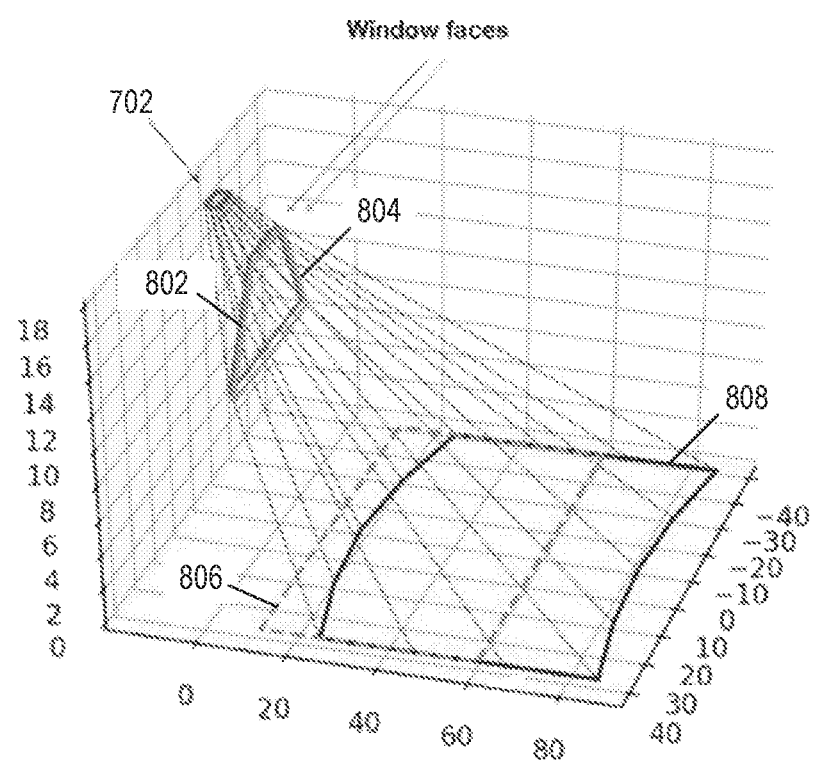
FIG. 8 is a diagram illustrating the manner in which the refraction of a projected image results in distortion of the image on the pool-bottom display surface in accordance with some embodiments.

As noted above, each of projectors 602 projects its respective images through a corresponding acrylic window 604. Because display images are projected from projector 602, through acrylic window 604 and the water in the pool enclosure to display surface 606, the projected images undergo some refraction which causes warpage. This is illustrated in FIGS. 7 and 8. FIG. 7 is a diagram illustrating the refraction of light through the acrylic window and the water in the pool in accordance with some embodiments. FIG. 8 is a diagram illustrating the manner in which the refraction of a projected image results in distortion of the image on the pool-bottom display surface.

Referring to FIG. 7, an image is generated at the image plane 702 of an in-wall projector and the image is projected through the acrylic window 704 in the wall of the pool enclosure, through the water 706 in the enclosure, and onto the display surface 708. The image plane is parallel to the display surface to maintain the focus of the image across the display surface. As the light of the projected image crosses the air-acrylic interface, the light is refracted toward the normal of the surface, since the index of refraction of the acrylic (1.49) is higher than the index of refraction of the air (1). As the light exits the acrylic window 704 into the water, air-acrylic interface, the light is refracted at the acrylic-water interface toward the normal of the surface, since the index of refraction of the acrylic (1.49) is higher than the index of refraction of the water (1.33).

Referring to FIG. 8, the refraction of the projected image as it passes through the air-acrylic and acrylic-water interfaces is again illustrated. It should be noted that the figure is intended to illustrate the refractive effects of the window and water, and the path of the projection in the figure does not necessarily accurately trace specific rays through the projector optics, window or water.

As depicted in this figure, the image is projected from the image plane 702 of the projector through an air gap to the acrylic window. The window is not explicitly shown in the figure. Instead, two trapezoidal polygons (keystone-shapes) 802 and 804 are depicted. Polygon 802 represents the outline of the projected image at the air-acrylic interface, while polygon 804 represents the outline of the projected image at the acrylic-water interface. The image is then projected from the acrylic window through the water to the display surface at the bottom of the pool.

The dashed outline 806 on the display surface indicates the outline of the image that would be projected onto the display surface if there were only air between the projector and the display surface. The shape of this outline is the same as the shape of the image at the image plane. The solid outline 808 on the display surface indicates the outline of the image that is actually projected onto the display surface. It can be seen from the figure that the actually displayed image 808 is not only displaced to the right with respect to the non-refracted image 806, but also distorted in comparison to the non-refracted image. As depicted in the figure, the edges of the image which are closest to the projector position and farthest from the projector position (i.e., top and bottom edges) are curved toward the projector position. The other edges of the image on the display surface are substantially straight.

It should be noted that the distortion may differ, depending upon the material and thickness of the window and the shape of the window surface. The distortion may also be affected by the shape of the display surface (e.g., flat versus curved). The distortion may also be affected by the position of the display surface (e.g., the distortion of an image projected onto a side surface of the pool enclosure may be different than the distortion of an image projected onto the pool-bottom or a distortion of an image projected onto the inclined surface at the forward end of the pool).

As noted above, images that are to be provided to the projectors for projection onto the pool-bottom display surface are processed to provide image correction which accounts for the distortion (warping) of the images. Thus, the distortion-corrected image which is provided to the projector will have, in this example, a shape which has top and bottom edges which are curved in the opposite direction of the solid outline shown on the display surface. This distortion-corrected image counters the effects of the warpage that results from refraction, resulting in an image shape on the display surface that, in this case, has straight edges similar to the shape of dashed outline 806. While the resulting displayed image may be distortion free, it may nevertheless be displaced from the refracted position as shown in the figure.

The pool-surface displays in the pool can enhance the user's swimming experience by projecting onto the display surfaces images of real or fictional environments. These environments may, for example, allow the pool system to simulate swimming near a coral reef, swimming with sharks, swimming competitively with other swimmers, etc. The system's game engine can generate the images to simulate these environments, appropriate image corrections can be applied to the images, and then the images can be projected onto the interior surfaces of the pool enclosure, where they can be viewed/experienced by the user/swimmer. At the same time the game engine can generate control signals which are provided to other systems, such as the water recirculation system, bubble generators, hot/cold water jets, etc. in synchronization with the displayed images to provide an immersive, interactive experience for the swimmer. The pool-surface displays can also be used to present a user interface or coaching interface to a swimmer in the pool. The interfaces can be used, for example, to enable user input to an interactive application, or to provide coaching/training guidance to the swimmer who is using the pool.

As noted above, embodiments of the technology are implemented using a computer system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer system may include, for example, a computer processor and associated memory. The computer processor may be an integrated circuit for processing instructions, or may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

A processor can include a system with multiple processing units, dedicated circuitry for achieving functionality, or other systems. Processing need not be limited to a geographic location, or have temporal limitations. The memory may store instructions executable by the processor. For example, the memory may include an operating system or processing program, a server program configured to extend the functionality of the page processing program or other server code. Application server code can be executable to receive requests from client computers, generate server files and return files in response.

Embodiments described herein can be implemented using control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement embodiments of the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system comprising:
    a flume pool having an enclosure with a floor and first and second side walls, wherein the enclosure is adapted to contain water therein;
    a first projector adapted to project a first image through the water from the first wall to a display surface on the floor of the enclosure;
    a second projector adapted to project a second image through the water from the second wall to the display surface on the floor of the enclosure; and
    a camera configured to capture overhead images corresponding to the first and second images projected on the display surface on the floor of the enclosure, wherein the first and second images comprise calibration images,
    wherein the camera comprises an overhead camera positioned above a level of the water in the pool enclosure and configured to capture the overhead images at least partially through an air-water interface.

2. The system of claim 1, wherein at least a portion of the first image projected on the display surface on the floor of the enclosure overlaps with a corresponding portion of the second image projected on the display surface on the floor of the enclosure.

3. The system of claim 2, further comprising:
    a camera configured to capture overhead images corresponding to the first and second images projected on the display surface on the floor of the enclosure, wherein the first and second images comprise calibration images; and
    a graphics processing unit (GPU) configured to receive the overhead images, the GPU further configured to generate one or more image corrections based on the overhead images which cause the portion of the first image which overlaps with the corresponding portion of the second image to seamlessly match.

4. The system of claim 1, further comprising a graphics processing unit (GPU) configured to receive the overhead images, the GPU further configured to generate one or more image corrections based on the overhead images which counter one or more corresponding distortions in the first and second images.

5. A system comprising:
    a flume pool having an enclosure with a floor and first and second side walls, wherein the enclosure is adapted to contain water therein;
    a first projector adapted to project a first image through the water from the first wall to a display surface on the floor of the enclosure;
    a second projector adapted to project a second image through the water from the second wall to the display surface on the floor of the enclosure; and
    a first window installed in the first wall, wherein the first projector is positioned to project the first image through the first window; and a second window installed in the second wall, wherein the second projector is positioned to project the second image through the second window:
    wherein the first and second windows are installed below a water level in the enclosure so that each of the first and second images is projected through a corresponding air-window interface and a corresponding window-water interface.

6. The system of claim 5, wherein the first projector is adapted to project the first image onto a portion of the display surface which is opposite the first wall, and wherein the second projector is adapted to project the second image onto a portion of the display surface which is opposite the second wall.

7. The system of claim 5, further comprising a layer of vinyl which is applied to the floor of the enclosure, the vinyl layer forming the display surface.

8. The system of claim 5, further comprising a forward surface of the pool enclosure, wherein the forward surface is inclined with respect to the floor of the enclosure.

9. The system of claim 8, wherein the forward surface is contiguous with the floor of the enclosure.

10. The system of claim 8, with at least a portion of the first image and a portion of the second image are projected onto the forward surface.

11. The system of claim 5, wherein the first projector and the second projector comprise ultra short throw digital laser projectors.

12. The system of claim 5, wherein each of the first and second windows comprises an acrylic material.

13. A system comprising:
- a flume pool having an enclosure with a floor and first and second side walls, wherein the enclosure is adapted to contain water therein;
- a first projector adapted to project a first image through the water from the first wall to a display surface on the floor of the enclosure;
- a second projector adapted to project a second image through the water from the second wall to the display surface on the floor of the enclosure; and
- a game engine configured to generate the first and second images;
- wherein the game engine is responsive to user input from a swimmer in the enclosure; and
- wherein the game engine is configured to generate images in synchronization with corresponding control signals that control a flow of the water through the enclosure.

14. A system comprising:
- a flume pool having an enclosure with a floor and first and second side walls, wherein the enclosure is adapted to contain water therein;
- a first projector adapted to project a first image through the water from the first wall to a display surface on the floor of the enclosure;
- a second projector adapted to project a second image through the water from the second wall to the display surface on the floor of the enclosure; and
- a game engine configured to generate the first and second images;
- wherein the game engine is responsive to user input from a swimmer in the enclosure; and
- wherein the game engine is configured to generate the first and second images by overlaying one or more coaching/training indicators on an image of the swimmer, the coaching/training indicators indicative of the swimmer's body position with respect to a desired body position.

\* \* \* \* \*